Nov. 20, 1962 W. ARONIS 3,065,461

MAGNETIC RECORDING APPARATUS

Filed June 30, 1958

INVENTOR.
WILLIAM ARONIS

BY Joseph J. Connerton
ATTORNEY

United States Patent Office 3,065,461 Patented Nov. 20, 1962

3,065,461

MAGNETIC RECORDING APPARATUS

William Aronis, Mount Marion, N.Y., assignor to International Business Machines Corporation, New York, N.Y., a corporation of New York Filed June 30, 1958, Ser. No. 745,502
1 Claim. (Cl. 340—174.1)

Figures 1, 2A, 2B:
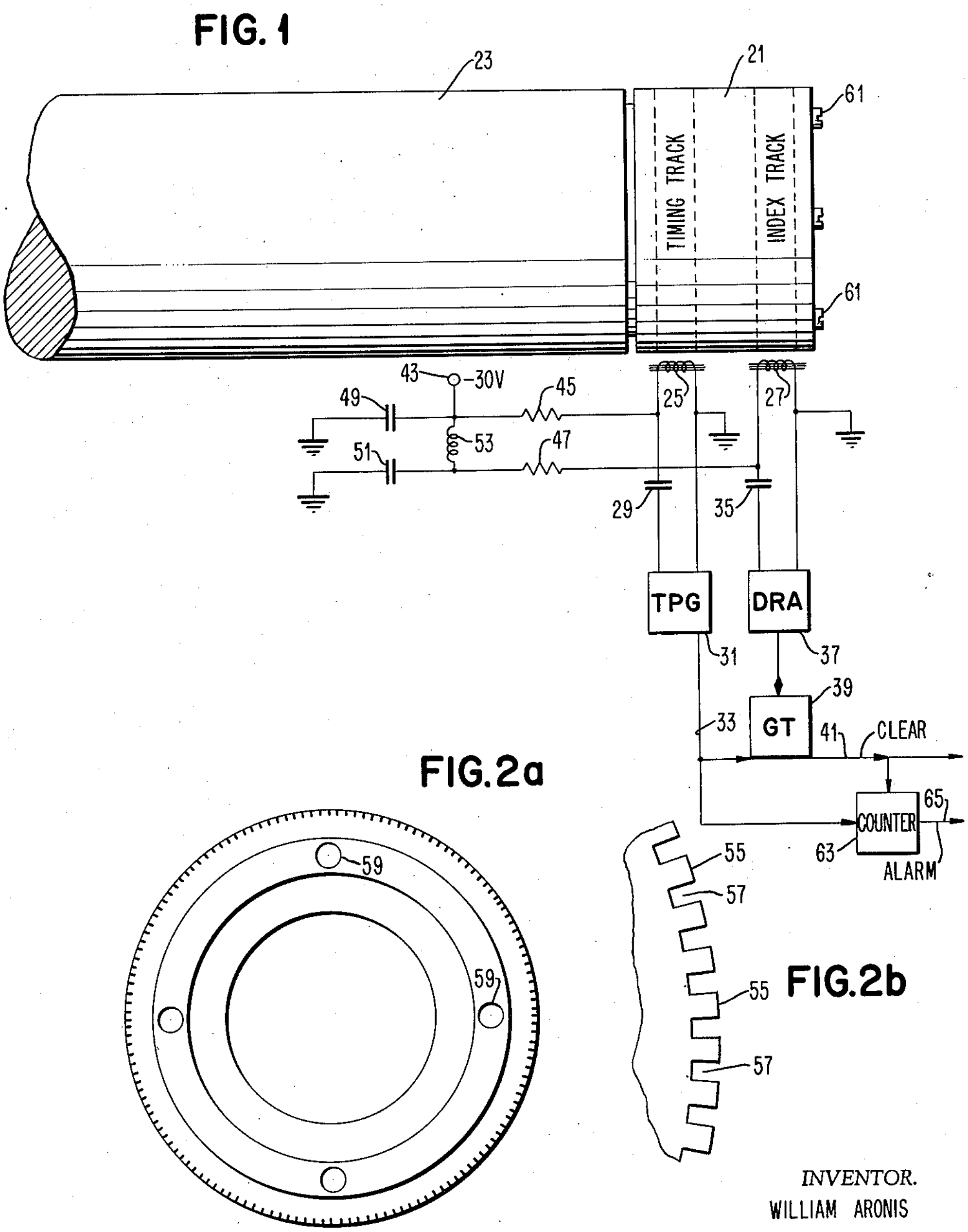

The present invention relates to recording apparatus and more particularly to a system for effecting simultaneous read and write operations on a magnetic record member.

In continuous loop storage devices such as magnetic drums or discs, the recording and recovery of data may be controlled by a timing source that bears a fixed physical relationship to the recording device. Generally this timing source comprises a timing track or channel around the periphery of the record member or a separate drum or disc associated with the record member. Such timing tracks contain a series of uniformly spaced signals or physical indentations thereon, indicating the location of axially positioned registers on the magnetic surface of the record member. In addition to a timing source, the recording medium usually includes an index source which establishes a reference position on the timing track, the index source generally comprising an individual track with a single indentation or signal recorded thereon.

Timing and index sources, such as timing and index tracks on a magnetic drum or disc, may be provided by various means. These tracks may be open or closed, the latter term designating that the tracks are re-entrant, and they may consist of a magnetizable track having a series of timing signals recorded thereon or a series of physical indentations on the track provided by milling or etching. Magnetically recorded tracks may require considerable electronic and auxiliary equipment for recording, and in addition must be re-recorded should they be erased or biased by the recording or reading medium.

Heretofore in magnetic recording operations using a timing and/or index track, individual heads have been employed to record and read timing and/or index signals. In accordance with the present invention, there is provided a system for effecting simultaneous read and write of an etched timing and/or index track or channel. The present invention employs a single recording head which is positioned adjacent to the associated track. With respect to the writing operation, this head when connected to a D.C. source constitutes a permanent magnetizing element which applies a constant m.m.f. to the etched track during rotation, the intensity of this m.m.f. being sufficient to provide and maintain saturation of the track. Simultaneously, reading is accomplished by the rotation of the etched track past the coil of the recording head, resulting in a sinusoidal signal being induced therein. By continuously applying a D.C. signal to the etched track or tracks as the record member rotates, the track is maintained in saturation and noise or undesirable bias buildup is prevented. The present invention may be employed with either a timing or an index track alone or may operate with both. In the arrangement using both, the A.C. signals from the timing track are converted to a succession of timing pulses at a zero crossover point of the sine wave which ensures that an index pulse is generated in synchronism with one of the timing pulses. By using a single head for recording and reading such tracks, it is possible to detect that a recording head is out of adjustment before any damage can be done to the surface of the recording medium. The invention provides a high degree of accuracy of timing and/or index indications for the life of the record member while eliminating or substantially reducing noise and bias buildup.

Accordingly a primary object of the present invention is to provide a system for effecting simultaneous writing and reading of an open or closed track on a magnetic recording medium of the continuous loop type.

A further object of the present invention is to provide a novel system for effecting simultaneous recording and reading on and from a rotative record member utilizing a single recording head.

Another and still further object of the present invention is to provide a novel method for indicating non-adjustment of a recording head functioning to simultaneously record and read a timing track.

Another object of the present invention is to provide a simple, reliable and accurate timing system on a magnetic drum.

A further object of the present invention is to provide a novel method for simultaneously recording and reading a drum timing and/or index channel.

Other objects of the invention will be pointed out in the following description and claims and illustrated in the accompanying drawings, which disclose, by way of example, the principle of the invention and the best mode, which has been contemplated, of applying that principle.

In the drawings:

FIG. 1 illustrates in simplified block form a preferred embodiment of the subject invention.

FIG. 2*a* illustrates a plan view of the etched timing disc.

FIG. 2*b* illustrates an enlarged view of one edge of the etched timing disc shown in FIG. 2*a*.

Referring now to the drawings and more particularly to FIG. 1 thereof, there is illustrated a simplified drawing of the general arrangement of the present apparatus. A disc 21 suitably mounted for rotation with a magnetic drum 23 has a permanent timing and index track etched thereon in a manner more fully described hereinafter. In a preferred embodiment, a succession of 2048 uniformly spaced grooves are etched around the periphery of a 10.7 inch diameter disc which is adapted to rotate at a speed of approximately 2914 r.p.m. Such a disc may be considered as comprising 2048 individual substantially identical magnets separated from adjacent magnets by magnetic gaps. Using these parameters as the disc 21 rotates, each magnet in the timing track causes a sinusoidal signal to be induced in recording head 25 as the winding on the recording head passes through the influence of the magnetic field. An exemplary showing of a recording head 25 which is suitable for use herein may be found in FIG. 1 of U.S. Patent 2,764,634 to C. E. Brooks et al.

In the above described embodiment, a succession of sinusoidal signals, each signal having approximately a 10 microsecond period, is induced in the recording head 25. Thus a 100 kc. sinusoidal signal is induced in recording head 25. The index track has only a single groove equal to those etched in the timing track, so that for each rotation of the record member a single sine wave having a 10 microsecond period is induced in recording head 27.

The sinusoidal signal induced in recording head 25 is coupled through capacitor 29 to a Timing Pulse Generator 31, labeled TPG. Timing Pulse Generator 31 is a circuit which generates a short duration pulse on conductor 33 at either the positive or negative zero crossover point of the applied sinusoidal input. Thus, in the preferred embodiment, these pulses are generated on conductor 33 and recur at 10 microsecond intervals. While TPG–31 may be any circuit which functions in the above-described manner, it is preferably of the type illustrated and described in co-pending application Serial No. 494,982 entitled, "Magnetic Data Storage," filed by R. R. Everett et al. on March 17, 1955.

As previously described, a single groove is etched into the index track, so that it effectively functions as a magnet with a single gap. This groove corresponds in position axially to one of the grooves in the timing track and in a preferred arrangement is extension of one of the timing slits. When the disc rotates and the winding of recording head 27 passes through the influence of the magnetic field, a single sine wave is induced therein and coupled through capacitor 35 to a Drum Read Amplifier 37. Drum Read Amplifier 37, labeled DRA, may be any circuit which amplifies and/or shapes the sinusoidal input to thereby provide a signal suitable for conditioning gate circuit 39. Gate circuit 39 may be any suitable one of several well-known types, but is preferably of the type shown and described in co-pending application Serial No. 414,459 entitled, "Electronic Digital Computer," filed by Bernard L. Sarahan et al. on March 5, 1954. This gate is sampled at 10 microsecond intervals by the pulse output from Timing Pulse Generator 31, and when conditioned by the index signal in the manner above-described, provides an output signal indicative of the index reference on conductor 41.

Referring back to recording heads 25 and 27, it will be noted that a negative D.C. potential from source 43 is applied through current limiting resistors 45 and 47 to timing and index track heads 25 and 27 respectively. The D.C. is applied to one side of the head while the other side of the head is grounded. The current limiting resistors 45 and 47 are so selected that the resulting current through the recording heads is sufficient to saturate the timing and index tracks as they rotate past the heads. In the preferred embodiment, a current in a nominal range of 100–200 milliamperes is sufficient to saturate the timing and/or index tracks.

A filter network comprising capacitors 49 and 51 and inductance 53 is a power supply decoupling network to prevent the signals read from the timing track from being applied to the Drum Read Amplifier in the Index Circuit. Capacitors 29 and 35, as heretofore noted, prevent D.C. power supply from being applied to the Timing Pulse Generator and Drum Read Amplifier respectively.

Referring now to FIG. 2*a*, there is illustrated therein certain structural details of the timing disc shown in simplified form as disc 21 in FIG. 1. Basically, the timing disc is a metallic disc which is initially plated with copper over which is plated a layer of nickel cobalt exhibiting both high retentivity and low coercivity characteristics. A layer of resist is then painted over the timing tracks, and 2048 slits cut into the resist. The disc is then put in an etching bath, and the nickel cobalt is etched in the slitted portions, leaving the copper exposed in the grooved areas and nickel cobalt in the land areas.

A portion of the outer edge is illustrated in enlarged form in FIG. 2*b*. The land areas 55 may be considered as individual magnets having north and south poles and separate from the adjacent magnet by non-magnetic gaps 57. By continuously saturating these tracks during operation, the magnetization is retained and the possibility of noise or bias buildup is eliminated. Mounting holes 59 provide openings through which the disc is bolted to the drum by bolts 61 (FIG. 1). The index track, not illustrated, would be perfectly spherical except for a single groove etched therein.

By utilizing a single head in the above-described manner, the necessity for individual heads to perform this operation is eliminated. In addition to the resultant lowered cost and maintenance, the subject circuit provides a novel means of indicating non-adjustment of the recording head. Utilizing separate read and write heads, if the write head should fall out of adjustment, it might injure the drum by actual contact with the drum surface, and this condition would probably not be detected until the drum had been damaged. Using the same head for read and write, however, this error would be detected in the following manner. Referring back to FIGURE 1, a predetermined counter 63 counts the output pulses from the timing track and is reset each revolution of the record member by the index pulse from gate 39 labeled Clear. Associated with the counter is an alarm circuit which is actuated when the contents of the counter differs from the number of timing signals recorded on the timing track. By using the same head for read and write as contemplated in the instant invention, the non-adjustment of the head would be indicated by an error produced during the read operation, and since the above-described test is performed each drum revolution, the lack of adjustment would be detected before any damage to the drum surface could occur. Counters suitably arranged to produce an alarm signal when the counter fails to indicate a predetermined count are known in the art. A counter having such provision wherein the contents of the counter are suitably inspected when the counter should indicate predetermined counts and alarm indication given when the contents are not as predetermined is shown and described in FIG. 16 of co-pending application Serial No. 582,578 entitled, "Data Storage System," filed by Francis Stern Montagny et al. on May 2, 1956.

By having the timing and index tracks on a disc, additional flexibility is afforded since a timing track change would merely require a new disc. However, where the capacity of the drum is fixed, the timing track could be etched on the nickel cobalt surface of the drum itself in the manner heretofore described. While the invention has been described with reference to a closed timing track, it is equally applicable to an open type of the same general type described above.

While there has been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claim.

What is claimed is:

A system for effecting simultaneous read and write operations comprising: a rotating surface having successively interspersed magnetic and non-magnetic areas, said magnetic areas exhibiting the property of high retentivity; a magnetic recording device, having a conductive winding thereon, positioned adjacent said rotating surface and effective, when energized, to establish a magnetic flux which impinges said rotating surface; a direct current source connected to said conductive winding to constantly energize said recording device thus causing said device to induce a saturating magnetic excitation in the magnetic areas of said rotating surface, said rotating surface simultaneously inducing a magnetic flux variation in said recording device, and, in turn, a current variation in said conductive winding; and output circuitry connected to said conductive winding and responsive only to variations in current in said winding.

References Cited in the file of this patent

UNITED STATES PATENTS

| | | |
|---|---|---|
| 2,648,829 | Ayres et al. | Aug. 11, 1953 |
| 2,685,682 | Sepahban | Aug. 3, 1954 |
| 2,696,599 | Holbrook et al. | Dec. 7, 1954 |
| 2,721,990 | McNaney | Oct. 25, 1955 |
| 2,759,171 | Fleming | Aug. 14, 1956 |
| 2,771,595 | Hendrickson et al. | Nov. 20, 1956 |
| 2,780,670 | Brewster | Feb. 5, 1957 |
| 2,789,218 | Leonard | Apr. 16, 1957 |
| 2,807,003 | Alrich | Sept. 17, 1957 |
| 2,824,776 | Elovic et al. | Feb. 25, 1958 |
| 2,850,720 | Oliwa et al. | Sept. 2, 1958 |
| 2,857,585 | Dickinson | Oct. 21, 1958 |
| 2,890,440 | Burkhart | June 9, 1959 |
| 2,895,123 | Foster | July 14, 1959 |
| 2,907,005 | Chien | Sept. 29, 1959 |
| 2,923,922 | Blickensderfer | Feb. 2, 1960 |

OTHER REFERENCES

A Phonic Wheel Generator for Position Indication in Digital Computer Magnetic Drum Storage, by D. R. Quested et al., Journal of Scientific Instruments, vol. 31, October 1954, pages 357–360.